United States Patent [19]

Rushmere

[11] Patent Number: 5,176,891
[45] Date of Patent: Jan. 5, 1993

[54] POLYALUMINOSILICATE PROCESS

[75] Inventor: John D. Rushmere, Wilmington, Del.

[73] Assignee: Eka Chemicals, Inc., Marietta, Ga.

[21] Appl. No.: 703,053

[22] Filed: May 17, 1991

Related U.S. Application Data

[63] Continuation of Ser. No. 213,479, Jun. 30, 1988, abandoned, which is a continuation-in-part of Ser. No. 143,349, Jan. 13, 1988, abandoned.

[51] Int. Cl.⁵ .............................................. C01B 33/34
[52] U.S. Cl. .................................. 423/328.1; 423/326
[58] Field of Search ............... 423/328, 329, 330, 326; 106/288 B; 502/407, 414

[56] References Cited

U.S. PATENT DOCUMENTS

| | | | |
|---|---|---|---|
| 2,217,466 | 10/1940 | Bayliss | 210/23 |
| 2,244,325 | 6/1941 | Bird | 252/313 |
| 2,552,323 | 5/1951 | Kimberlin | 423/328 |
| 3,224,927 | 12/1965 | Brown et al. | 162/155 |
| 3,253,978 | 5/1966 | Bodendorf et al. | 162/152 |
| 3,959,444 | 5/1976 | Yokoi et al. | 423/328 |
| 4,213,949 | 7/1980 | Mahler et al. | 423/329 |
| 4,213,950 | 7/1980 | Mahler | 423/329 |
| 4,388,150 | 6/1983 | Sunden et al. | 162/175 |

FOREIGN PATENT DOCUMENTS

| | | | |
|---|---|---|---|
| 8600100 | 1/1986 | World Int. Prop. O. | 162/181.6 |
| 8605826 | 10/1986 | World Int. Prop. O. | 162/181.6 |

OTHER PUBLICATIONS

Iler, *The Chemistry of Silica*, John Wiley & Sons, New York (1979), pp. 174–176, 301–304, 407–410.

Merrill et al., "Activated Silica, A New Chemical Engineering Tool", *Chemical Engineering Progress*, vol. 1, No. 1, (1947), pp. 27–32.

Vail, *Soluble Sicicates*, vol. II, Reinhold Publishing Co., New York (1960), pp. 524–549.

Sears, *Analytical Chemistry*, 28 (1956), pp. 1981–1983.

*Primary Examiner*—R. Bruce Breneman
*Attorney, Agent, or Firm*—Burns, Doane, Swecker & Mathis

[57] ABSTRACT

A method for the production of water soluble polyaluminosilicate microgels by the reaction of dilute polysilicic acid solutions with dilute solutions of alkali metal aluminates.

14 Claims, No Drawings

POLYALUMINOSILICATE PROCESS

This application is a continuation of application Ser. No. 07/213,479, filed Jun. 30, 1988, now abandoned, which in turn is a continuation-in-part of application Ser. No. 07/143,349, filed Jan. 13, 1988, now abandoned.

FIELD OF INVENTION

This invention relates to water soluble polyaluminosilicate microgels, a process for making them and the use of the polyaluminosilicate microgels as highly anionic colloidal sols in papermaking. More specifically, it relates to making water soluble polyaluminosilicate microgels by aluminating microgels of polysilicic acid.

BACKGROUND AND SUMMARY OF INVENTION

It is known that amorphorus, water insoluble polyaluminosilicates can be formed by the reaction of alkali metal polysilicates with alkali metal aluminates. Such polyaluminosilicates or synthetic zeolites have found use as catalysts, catalyst supports and ion exchange materials. Also, it is known that the particles in colloidal silica sols can be surface aluminated by aluminate ions to form a coating of polyaluminosilicate as disclosed in the book "The Chemistry of Silica" by Ralph K. Iler, John Wiley & Sons, NY, 1979, pp. 407-410.

U.S. Pat. No. 4,213,950 discloses an improved process for the preparation of amorphous, water insoluble polyaluminosilicates by the reaction of alkali metal aluminates with aqueous polysilicic acid at pH 2-4. The disclosure stresses the use of true solutions of polysilicic acid not appreciably crosslinked and distinguished from colloidal solutions, suspensions, dispersions and gels.

The present invention is concerned with the preparation of new water soluble polyaluminosilicate microgels having unique properties and characteristics. The new materials are formed over a wide pH range of 2-10.5 by the reaction of aqueous solutions of partially gelled polysilicic acid and an aqueous solution of an aluminum salt, preferably an alkali metal aluminate, followed by dilution of the reaction mix before gelation has occurred in order to stabilize the polyaluminosilicate microgels in an active form. Alternatively, the water soluble polyaluminosilicate microgels may be produced by dilution of the polysilicic acid stock before mixing with the alkali metal aluminate. The water soluble polyaluminosilicates so produced are distinct from the amorphous polyaluminosilicates and polyaluminosilicate coated colloidal silicas of the prior art in that they have a very high surface area, typically 1000 meter$^2$/gram (m$^2$/g) or greater and surprisingly a very high surface acidity, typically 1 milliequivalent/gram (meq/g) or greater. The alumina/silica mole ratio or content is generally greater than about 1/100 and preferably between about 1/25 and ¼. Their physical structure is believed to consist essentially of aggregates of very small particles of silica, surface aluminated, formed into chains and crosslinked into three-dimensional networks or microgels. Some colloidal silica and colloidal alumina particles may be present with the polyaluminosilicate microgels.

The polyaluminosilicates of this invention are formed by the reaction of polysilicic acid with an aluminum salt, preferably an alkali metal aluminate. They consist of aggregates of very small particles having a high surface area, typically about 1000 meters$^2$/gram (m$^2$/g) or greater and an alumina/silica mole ratio or content greater than about 1/100 and preferably between about 1/25 and ¼. Their physical structure is believed to form particle chains and three dimensional networks.

The polyaluminosilicates thus formed provide improved operating benefits over the aluminated colloidal silicas of the prior art in papermaking, for example. Such commercial aluminated colloidal silicas used in papermaking consist of larger, non-aggregated particles with a surface area of about 500-550 m$^2$/g, a surface acidity of 0.66 meq/g or less, and an alumina/silica mole content of about 1/60.

The water soluble polyaluminosilicates of this invention are believed to derive their structure from the polysilicic acid stock formed initially by an appropriate deionization or acidification of a dilute alkali metal polysilicate, for example Na$_2$O.3.2SiO$_2$. Such polysilicic acid stock, also known as "active silica" consists, according to Iler in the above cited text, pp. 174 and 301-303, of very small 1-2 nanometer (nm) primary particles which are aggregated into chains and three dimensional networks. Such networks or microgels, when converted to aluminosilicates by reaction with sodium aluminate exhibit a considerably greater efficiency in flocculating fiber and filler fines than larger non-aggregated aluminated silica particles particularly when employed with a cationic polymer, such as cationic starch, cationic guar or cationic polyacrylamide. The greater efficiency in flocculation is believed to result from both the increased effectiveness of the microgel structure in locking together or bridging pulp and filler fines and also from the high surface acidity more effectively completing charge neutralization reaction with the cationic components.

The water soluble polyaluminosilicates have a wide range of application to different papermaking stocks including those containing bleached kraft pulp, groundwood pulp and thermomechanical pulp. They may also be used for the clarification of white waters and the recovery of pulp and filler components. They function well under both acid and alkaline papermaking conditions, that is, over a pH range of about 4-9.

U.S. Pat. No. 2,217,466 describes the early use of polysilicic acid or active silica as a coagulant aid in the treatment of raw water. The article "Activated Silica, a New Chemical Engineering Tool" by Merrill and Bolton, Chem. Eng. Progress 1 (1947), 27, summarizes the development and application of anionic active silica and mentions its use as a coagulant for paper mill white water and as a retention aid for fiber and filler fines when added to the head box of a paper machine. No mention is made of the co-use of anionic active silica together with cationic polymers.

U.S. Pat. Nos. 3,224,927 and 3,253,978 disclose the co-use of cationic starch together with anionic colloidal silica as a binding agent for inorganic fibers in refractory fiber bonding applications. The quantities of colloidal silica used are considerably larger than in papermaking applications, that is, 10-20 weight percent (wt. %) of the product for fiber bonding versus about 1 wt. % of the product for paper applications. Also, in fiber binding, conditions leading to flocculation are to be avoided whereas in papermaking, flocculation is a desired result of the additions.

U.S. Pat. No. 4,388,150 discloses a binder composition comprising colloidal silicic acid and cationic starch for addition to papermaking stock to improve retention of stock components or for addition to the white water to reduce pollution problems and to recover stock component values.

International Patent Publication WO86/00100 extends the application of colloidal silicas in papermaking to more acid conditions by describing the co-use of aluminated colloidal silica with cationic starches and cationic guars. Alumination provides stronger acid sites on the surface of the colloidal silica. As a consequence, anionic charge is maintained well into the acid range. The preferred compositions are those containing non-aggregated silica particles of relatively large 5-6nm diameter, low surface area of 500 $m^2/g$ and an alumina/silica mole content of about 1/60.

International Patent Publication WO86/05826 describes the co-use of the above aluminated colloidal silica and cationic polyacrylamides in papermaking.

DETAILED DESCRIPTION OF THE INVENTION

Preparation of the polyaluminosilicates of the invention require the initial preparation of polysilicic acid microgels otherwise known as active silica. Methods for the preparation of active silica are well described in the book "Soluble Silicates," Vol. II, by James G. Vail and published by Reinhold Publishing Co., NY, 1960. In general, the methods all involve the partial acidification usually to about pH 8-9 of a dilute solution of alkali metal silicate such as sodium polysilicate $Na_2O.3.2SiO_2$. Acidification has been achieved using mineral acids, acid exchange resins, acid salts and acid gases. The use of some neutral salts as activators has also been described.

For the purpose of practicing the present invention, acid deionization of a dilute solution of sodium polysilicate, is preferred although the other methods of activation reported in the literature may also be used. Iler, in the above stated text at page 288, teaches that solutions containing up to 12 wt. % $SiO_2$ can be used in the formation of polysilicic acid, the higher percentages requiring rigorous, tightly controlled operating conditions. While the full range can be used in the practice of this invention, $SiO_2$ concentration in the range of 0.1-6 wt. % is preferred. Acidification using any strong acid exchange resin known in the art, such as disclosed in U.S. Pat. No. 2,244,325 is preferred since it effectively removes the unwanted sodium value of the sodium silicate. If this sodium value is not removed and sulfuric acid, say, is used for the acidification considerable quantities of sodium sulfate are generated in the product. This sodium sulfate can be burdensome in maintaining both pollution and corrosion control standards.

The deionization is preferably conducted into the acid range of pH 2.5-5 although the higher pH ranges of 5-10.5 may also be employed particularly if higher sodium ion concentration can be tolerated. In the pH 2.5-5 range, the polysilicic acid is metastable and conditions are favorable for aggregation of the very small, high-surface-area particles into the desired chain and three dimensional networks described earlier.

While the pH range 5-8 may be employed and the novel water soluble polyaluminosilicates produced, the range is best avoided other than for the acidification of the more dilute solutions of sodium polysilicate. Over the pH range 5-8 polysilicic acid gels rapidly frequently leaving insufficient time for the reaction with alkali metal aluminate.

If the partial acidified range of pH 8-10.5 is to be employed acidification using a mineral acid such as sulfuric acid is preferred. Acidification to pH 8-10.5 by ion-exchange leads to incomplete removal of sodium value (i.e., inorganic salt contamination) from the system and hence the use of this more expensive system is hardly justified. Acidification using the mineral acid is readily and easily conducted and the co-produced inorganic salt facilitates the formation in the alkaline range of the desirable polysilicic acid microgels while inhibiting the undesirable growth of the small particles into discrete larger particles.

The surface area of the polysilicic acids so formed generally exceeds from about 1000 $m^2/g$, typically ranging to 1300 $m^2/g$, most often about 1100 $m^2/g$. All have been found to be effective for the formation of polyaluminosilicates.

Silica concentrations in the range of 3-6 wt. % are generally preferred for the formation of polysilicic acid stocks since at these concentrations factors associated with product aging are at a minimum. However, the metastability of the polysilicic acid to storage must also be considered. The metastability of the polysilicic acid so formed has been found to vary with the silica concentration and method of preparation. For example, at 3 wt. % $SiO_2$ when prepared by batch deionization the stability at ambient temperatures is less than a day before gelation occurs. When the polysilicic acid is formed by column-deionization, stability at ambient temperatures of greater than one day can be achieved even at 6 wt. % $SiO_2$. At 1 wt. % $SiO_2$, however, stability at ambient temperatures is excellent as measured by only small losses in surface area and no visible signs of increased viscosity or gelation over a period of three to four weeks. Further, at 1 wt. % $SiO_2$ concentration, surface area was found to decrease only slowly. One product with an initial surface area of 990 $m^2/g$ (as measured by the titration method of G. W. Sears, Anal. Chem. 28 (1956), 1981), decreased in surface area by only 15% over a period of a month. It was also still an effective starting material for forming polyaluminosilicates.

While aging is not essential, it has been found that generally the suitability of polysilicic acid as a precursor for the polyaluminosilicates improves with aging so long as the time of aging is less than the time it takes for the polysilicic acid to gel. That is, polyaluminosilicates prepared from 1 wt. % polysilicic acid (polysilicic acid containing 1 wt % $SiO_2$), for example, that has been aged for 24 hours are frequently more effective flocculation agents than polyaluminosilicates from the same polysilicic acid when freshly prepared. The aging period has allowed time for more particle chain and three dimensional network formation.

It is important to stress the need for three dimensional network or microgel formation in the polysilicic acid stock used. While the formation of a total gel was evidenced by highly increased viscosity and water insolubility is to be avoided, the formation of the microgel is extremely important. The microgel or three dimensional network formation represents the initial stages of the gelation process before any significant increase in viscosity has occurred. Microgel formation is a function of time, silica concentration, pH and the presence of neutral salts, and significant differences can be observed in the performance of polysilicic acid formed by different modes of deionization. For example, if the deionization of a 1 wt. % $SiO_2$ solution, as sodium polysilicate ($Na_2O.3.2SiO_2$) is conducted rapidly, that is in a batch mode with a large excess of ion-exchange resin, the polysilicic acid product is likely to have little three dimensional network or microgel formation and will be less effective as a stock for polyaluminosilicate formation until it has aged. On the other hand, if the deionization is conducted slowly with successive small additions of ion-exchange resin and pH equilibration at each stage, the resultant polysilicic acid will require no further aging to produce polyaluminosilicates showing excellent performance.

In practice a preferred mode of polysilicic acid stock preparation is to acidify the more concentrated sodium polysilicate solutions (3–6 wt. % $SiO_2$) to facilitate microgel formation and then to dilute to 1 wt. % $SiO_2$ or less to stabilize.

After the polysilicic acid has been prepared it is mixed with the required amount of alkali metal aluminate to form the polyaluminosilicate having an alumina/silica content greater than about 1/100 and preferably 1/25 to ¼. Any water soluble aluminate is suitable for this purpose. Sodium aluminates are the most readily available commercially and are therefore preferred. Solid sodium aluminate generally contains a slightly lower sodium/aluminum mole ratio than liquid sodium aluminate (that is, 1.1/1 for solid versus 1.25/1 for liquid). Lower sodium in the solid aluminate is advantageous in minimizing cost and sodium content of the polyaluminosilicates. Offsetting this advantage is the considerable convenience of using the commercial liquid aluminate products.

Dilute solutions of aluminate are preferred. For example, a sodium aluminate solution containing about 2.5 wt. % $Al_2O_3$ prepared by diluting VSA 45, available from Vinings Chemical Co., Atlanta, Ga., is suitable for this purpose.

The alkali metal aluminate must be added before the polysilicic acid gels and preferably at a time that is less than 80% of the time it would take the polysilicic acid to gel.

After formation, the polyaluminosilicates are diluted to whatever concentration the end use requires. For example, dilution preferably to the equivalance of 2.0 wt. % $SiO_2$ or less and more preferably to 0.5 wt. % or less is appropriate for addition to the papermaking process. As prepared, the polyaluminosilicates retain their high flocculation characteristics for about 24 hours.

Because of the metastability of the polyaluminosilicates and the polysilicic acid precursor and the prohibitive cost of shipping stable, but very dilute, solutions containing about 1 wt. % silica, a preferred embodiment is to produce the polyaluminosilicate at the location of intended use.

The polyaluminosilicate made by the process of this invention is more reactive and efficient in the papermaking process than the commercial aluminated colloidal silicas that are currently used. They also are cheaper, particularly if made at the location of intended use. The user's unit cost of silica in sodium polysilicate ($Na_2O.3.2SiO_2$) is about one-tenth that of silica in commercial aluminated colloidal silicas.

In the papermaking process, cationic polymers, derived from natural and synthetic sources have been utilized together with the polyaluminosilicates. These cationic polymers include cationic starches, cationic guars and cationic polyacrylamides, the application of which to papermaking has all been described in the prior art.

Generally, cationic starches are to be preferred since these have the advantages of low cost and of imparting dry strength to the paper. Where paper strength is not a primary requirement, use of the other polymers may be advantageous.

The cationic starch used may be derived from any of the common starch producing materials such as corn starch, potato starch and wheat starch, although the potato starches generally yield superior cationized products for the practice of this invention. Cationization is effected by commercial manufacturers using agents such as 3-chloro-2-hydroxypropyltrimethylammonium chloride to obtain cationic starches with degrees of nitrogen substitution varying between about 0.01 and 0.1 wt. % nitrogen. Any of these cationic starches may be used in conjunction with the polyaluminosilicates of the invention. A cationic potato starch with a nitrogen content of about 0.03 wt. % has been most frequently employed. In use, the polyaluminosilicates are employed in amounts ranging from about 0.01 to 1.0 wt. % (0.2 to 20 lb./ton) of the dry weight of the paper furnish together with cationic polymer in amounts ranging from about 0.01 to 2.0 wt. % (0.2 to 40 lb./ton) of the dry weight of the paper furnish. Higher amounts of either component may be employed but usually without a beneficial technical gain and with the penalty of increased costs. Generally preferred addition rates are about 0.05 to 0.2 wt. % (1–4 lb./ton) for the polyaluminosilicates together with 0.5 to 1.0 wt. % (10–20 lb./ton) of cationic starch and 0.025 and 0.5 wt. % (0.5 to 10 lb./ton) for the cationic guars and cationic polyacrylamides.

Characterization of Polyaluminosilicates

Surface Acidity

The polyaluminosilicates of the invention have an unexpectedly high surface acidity. This surface acidity may be up to 6 times more per gram than the surface acidity of a corresponding aluminated commercial colloidal silica of high surface area.

Table A lists the surface acidity in milliequivalents per gram (meq/g) of a series of polyaluminosilicates prepared by the reaction of calculated amounts of sodium aluminate with a 1-day old, 1 wt. % stock solution of polysilicic acid with a surface area of 1147 $m^2/g$. Also, listed in Table A are the surface acidities of a series of samples with corresponding degrees of surface alumination but prepared from a commercial colloidal silica with a surface area of 550 $m^2/g$. Surface acidity was determined in all cases by colloid titration using 2 wt. % cetyltrimethylammonium bromide as titrant. End point detection was the point of zero charge determined using an Electrokinetic Sonic Amplitude device supplied by Matec Instruments, Inc., Hopkinton, Mass. 01748.

Included in Table A is an "R" Column which represents the ratio of surface acidity for polyaluminosilicates to that for aluminated colloidal silica. The value of "R" is always greater than 2.09 which value corresponds to the ratio of the surface areas of the stock polysilicic acid and colloidal silica (1147/550=2.09). This shows that the increase in surface acidity of polyaluminosilicates is not primarily a function of increased surface area and establishes that these compounds have a different chemical composition than conventional aluminated colloidal silicas.

Surface Area

Surface area determinations on polysilicic acids were conducted using the titrimetric method of G. W. Sears, Anal. Chem. 1956 (28), 1981. After conversion to polyaluminosilicates it was necessary to remove interfering aluminum by digestion of the polyaluminosilicate with a strong acid resin before conducting the titration. Tests indicated little difference in the surface area of polysilicic acid stocks before and after alumination.

TABLE A
ALUMINATED COLLOIDAL SILICA AND POLYSILICIC ACID SAMPLES
(Acid Site Content, milliequivs./gm)

| Surface Alumination | Colloidal Silica | Polysilicic Acid | "R" |
|---|---|---|---|
| 1 | — | 0.63 | — |
| 2 | 0.38 | 0.92 | 2.42 |
| 4 | 0.45 | 1.19 | 2.64 |
| 6 | 0.51 | 1.60 | 3.14 |
| 8 | 0.56 | 1.98 | 3.54 |
| 10 | 0.59 | 2.17 | 3.68 |
| 12 | 0.59 | 2.45 | 4.15 |
| 14 | 0.57 | 2.78 | 4.88 |
| 16 | 0.57 | 2.83 | 4.96 |
| 18 | 0.57 | 2.95 | 5.18 |
| 20 | 0.55 | 3.04 | 5.52 |
| 25 | — | 3.19 | — |

EXAMPLES

For the purpose of demonstrating the significant superiority of the polyaluminosilicates of the present invention over the aluminated colloidal silicas of the prior art, comparison tests have been made using the retention/drainage aid system marketed in the United States under the trade name "Compozil" (Procomp, Marietta, Ga.).

"Compozil" is a two-component system comprising BMB—a cationic potato starch and BMA-9—an aluminated colloidal silica. The BMA-9 product contains non-aggregated silica particles of surface area about 500 m$^2$/g with an alumina to silica mole ratio of about 1/60 and a surface acidity of about 0.66 meq/g.

In conducting the comparisons, both Canadian Standard Freeness measurements for drainage and Britt Dynamic Drainage Jar measurements for fines retention have been made. For both types of measurements mixing conditions and order of addition of the components have been maintained. Optimum results are usually obtained if the cationic polymer is added first to the papermaking furnish followed by the polyaluminosilicate, although the reverse order of addition can also be followed.

Mixing in all examples was conducted in the Britt Jar at an agitator speed of 800 rpm. For freeness measurements the treated furnish was then transferred to the cup of the freeness tester. The following mixing times were followed: (1) add furnish to Britt Jar and stir for 15 seconds, (2) add cationic polymer and stir for 15 seconds, (3) add polyaluminosilicate and stir for 15 seconds, and (4) drain for fines retention measurement or transfer to freeness tester for freeness measurement.

Preparation of Polyaluminosilicates

Method A sodium polysilicate (Na$_2$O.3.2SO$_2$) was diluted with water to provide 500 grams of a solution containing 1 wt. % SiO$_2$. To this was added slowly, in stages about 100 grams of Dowex ® 50W-X8(H$^+$), a strong sulfonic acid ion exchange resin in the acid form. The mixture was well stirred and the pH followed until it had reached a pH of about 3. The resin was removed from the polysilicic acid by filtration. With no aging period of the polysilicic acid solution, sufficient dilute sodium aluminate solution containing 2.5 wt. % Al$_2$O$_3$ was added to form the polyaluminosilicate of the desired Al$_2$O$_3$/SiO$_2$ ratio. The polyaluminosilicate was diluted to 0.5 wt. % SiO$_2$ or less for use in the following examples.

Method B

Commercial sodium polysilicate (Na$_2$O.3.2SiO$_2$) was diluted with water to provide 300 g of a solution containing 4 wt. % SiO$_2$. To this solution was added with good agitation, 19.0 ml of 1.98M sulfuric acid over a period of about 1 minute. Following the acidification, portions of the polysilicic acid were sampled over the next four hours and diluted to 200 g to give dilute solutions containing 0.125 wt. % SiO$_2$. These dilute solutions were converted to highly efficient polyaluminosilicate by the addition of 2.5 g of 1.25 wt. % Al$_2$O$_3$ solution (as sodium aluminate). The stock polysilicic acid gelled overnight (18 hours).

EXAMPLE 1

Drainage Comparisons

In this example measurements were made of the drainage performance of various polyaluminosilicate compositions of the invention when used in combination with a commercial sample of "Compozil" cationic starch component BMB, S-190. All tests were made at a constant starch loading of 20 lb./ton. Comparison tests were also made using a commercial sample of "Compozil" aluminated silica component BMA-9. All polyaluminosilicates used were freshly prepared. That is, just prior to the tests, fresh polysilicic acid containing 1 wt. % SiO$_2$ prepared by acid deionization of sodium polysilicate, Na$_2$O.3.2SiO$_2$) was mixed with the desired amount of dilute sodium aluminate (2.5 wt. % Al$_2$O$_3$) and the mixture was then diluted to 0.5 wt. % or less.

The furnish used was a fine paper furnish containing 70% bleached kraft pulp (70% hardwood, 30% softwood), 29% Kaolin clay and 1% calcium carbonate. To this, 0.66 g/l of anhydrous sodium sulfate was added as electrolyte and the pH was adjusted to 4.5 by the addition of sulfuric acid. The furnish was made up at 0.5 wt. % consistency but diluted to 0.3 wt. % consistency for freeness measurements.

The results are given in Table 1, from which it may be seen that the polyaluminosilicates of the invention out-performed the commercial sample of aluminated colloidal silica (BMA-9). The more preferred polyaluminosilicates, namely those with Al$_2$O$_3$/SiO$_2$ mole ratios of 13/87 and 17/83 gave significantly higher drainage values even when using considerably less material. For instance, BMA-9 at a typical commercial loading of 4 lb./t gave a freeness of 385 ml whereas the 13/87 polyaluminosilicate gave an essentially equivalent freeness of 395 ml at a loading of only 1 lb./t—a fourfold reduction in material use.

EXAMPLE 2

Drainage Comparisons

In this example measurements were made of the drainage performance of the 13/87 polyaluminosilicate when used in conjunction with various cationic starches. The polyaluminosilicate loading was held constant at 3 lb./t and the starch loading varied between 0 and 40 lb./t. A comparison was also made with the BMA-9/BMB combination of the commercial Compozil system under the same variables. The furnish used was of the same composition to that used in Example 1 and the pH was again 4.5. The starches used were:

BMB S-190—a cationic potato starch imported from Europe for "Compozil",

Stalok ® 400—a cationic potato starch manufactured in the U.S. by A. F. Staley Co., Decatur, Ill., and Stalok ® 324—a cationic waxy corn starch manufactured in the U.S. by A. F. Staley Co., Decatur, Ill.

The results in Table 2 show that the 13/87 polyaluminosilicate of the invention when used in combination with either of the cationic potato starches (BMB S-190 or Stalok ® 400) clearly out-performed the commercial BMA-9/BMB system. Larger drainage values were obtained at lower starch loadings - an economy in papermaking operations where dry strength is not a primary requirement. The performance of the cationic waxy corn starch (Stalok ® 324) was inferior as has been found to be the case generally with the lower molecular weight starches.

EXAMPLE 3

Drainage Comparisons

In this example, drainage measurements have been made for the 13/87 polyaluminosilicate in an alkaline furnish at pH 8. The furnish was a similar composition to that used in Example 1 except that precipitated calcium carbonate replaced the clay as inorganic filler. All tests were made at a constant cationic starch loading of 20 lb./t. The starch used was BMB S-190. Comparison measurements were also made using aluminated colloidal silica of the prior art (BMA-9), simple polysilicic acid (non-aluminated) and also sodium aluminate alone. The results are given in Table 3 and again show that the 13/87 polysilicoaluminate gives significantly improved freeness at lower loadings compared to the prior art sol. It may also be seen that the polysilicic acid alone and sodium aluminate alone (but both used in conjunction with 20 lb./t cationic starch) have no effect in improving freeness. It is their reaction product, the polyaluminosilicate of the invention, that effects improvements.

EXAMPLE 4

Fines Retention

In this example, measurements of fines retention were made using a Britt Dynamic Drainage Jar. The furnish used was an alkaline furnish at pH 8 of the same composition to that used in Example 3. The polysilicoaluminate used was that containing the 13/87 mole ratio of $Al_2O_3/SiO_2$ and comparison was again made to BMA-9 aluminated colloidal silica. Sol loading was held constant in each case at 6 lb./t and the starch loading varied between 4 and 20 lb./t. Results are in Table 4.

Using the polyaluminosilicate of the invention very significant improvements in fines retention were obtained at all starch loadings, particularly in the common commercial range of 12-20 lb./t. Compared to the prior art system, economies in paper manufacture could be obtained by the need to use less starch to maintain the same level of fines retention.

EXAMPLE 5

Drainage Test Using Stoneground Wood

In order to demonstrate the wide applicability of the polyaluminosilicates to papermaking pulp systems freeness measurements were made on a 0.3 wt. % furnish comprising 100% stoneground wood (aspen) under very acid conditions, pH 4.0. Stoneground wood represents the coarse end of pulp systems, whereas bleached kraft pulp represents the fine end. Stoneground wood is characterized by poor drainage (freeness) and high fines content. The results recorded in Table 5 show how increasing the amounts of 13/87 polyaluminosilicate used in conjunction with 20 lb./t cationic starch (BMB S-190) increased the freeness of the pulp system. Turbidity measurements for the white water from the freeness tests are also recorded. Decreasing turbidity is an indication of improved fines retention.

EXAMPLE 6

Drainage Test

In this example, a comparison was made of the drainage of polyaluminosilicate/cationic guar combinations versus aluminated colloidal silica/cationic guar combinations of the prior art. The polyaluminosilicate was a freshly prepared 13/87, $Al_2O_3/SiO_2$ mole ratio product, the aluminated silica sol was a commercial BMA-9 sample and the cationic guar was Jaguar ® C-13 (Stein, Hall & Co., NY, N.Y.). Comparisons were made using both a clay-filled furnish similar to that of Example 1 at pH 4.5 and a calcium carbonate filled furnish similar to that of Example 3 at pH 8.0. Results are given in Table 6. All tests were made at a constant guar addition of 4 lb./t (0.2 wt. %). The superiority of the polyaluminosilicate/cationic guar combinations over the prior art aluminated silica sol/cationic guar combinations is clearly demonstrated.

EXAMPLE 7

Drainage Tests

In this example a comparison is made of the drainage benefits of a polyaluminosilicate/cationic polyacrylamide combination over an aluminated silica sol/cationic polyacrylamide combination of the prior art. The polyaluminosilicate was a freshly prepared 13/87 mole product, the aluminated colloidal silica was a commercial sample of BMA-9 and the cationic polyacrylamide was a sample of Hyperfloc ® 605 (Hychem Inc., Tampa, Fla.) with a mol wt. of about 10 million (MM) and with a cationic content of 20-30 wt. %. Table 7 lists the results obtained in a calcium carbonate filled furnish at pH 8 similar to Example 3 and shows improved drainage performance of the polysilicate/cationic polyacrylamide combination over the prior art. All tests were made at 2 lb./t (0.1 wt. %) of cationic polyacrylamide.

EXAMPLE 8

Drainage Tests

This example demonstrates the use of polyaluminosilicates formed from a polysilicic acid stock prepared by the partial acidification of sodium polysilicate as described in Method B, above. The effect of aging of the polysilicic acid stock on performance is illustrated.

After the acidification step of Method B, the resultant solution of polysilicic acid containing 3.75 wt. % silica was allowed to stand. During the next 4 hours the polysilicic acid was sampled at intervals and the sample portion diluted to contain 0.125 wt. % silica. This was then aluminated by reaction with an aqueous solution of sodium aluminate containing 1.25 wt. % alumina to provide polyaluminosilicates with an alumina/silica mole ratio of 1/14. Based on a surface area of 1163 m$^2$/g this degree of alumination corresponded to a surface coverage of about 16%.

For the drainage tests, an alkaline fine paper furnish similar to that used in Example 3 was used. All tests were conducted at loadings of 20 pounds per ton (lb./t) BMB-S190 cationic starch and 4 lb./t polyaluminosilicate. The results are give in Table 8 from which it may be seen that the polysilicic acid produced the highest performing polyaluminosilicate after about 40 minutes standing. All samples clearly out-performed the sample of commercial aluminated colloidal silica (BMA-9).

A determination of the surface acidity of a polyaluminosilicate formed after about 3 hours aging of the polysilicic acid stock showed a surface acidity of 1.84 meq/g which is significantly less than the value of 2.83 meq/g reported in Table A for 16% surface aluminated polysilicic acid. However, sodium sulfate produced in the partial neutralization of sodium polysilicate interferes with the surface acidity titration. A redetermination of the surface acidity of a 16% surface aluminated colloidal silica as included in Table A in the presence of an equivalent amount of sodium sulfate showed that the surface acidity of this product has fallen to 0.275 meq/g. Thus the "R" value of the two products in the presence of sodium sulfate remains about the same, i.e., 6/1.

TABLE 1

DRAINAGE COMPARISONS

| Polyaluminosilicate $Al_2O_3/SiO_2$ Mole Ratio | Freeness, ml at Sol Loading of | | | | |
|---|---|---|---|---|---|
| | 0 lb./t | 1 lb./t | 2 lb./t | 4 lb./t | 8 lb./t |
| 2/98 (BMA-9) | 330 | 330 | 345 | 385 | 420 |
| 4/96 | 330 | 365 | 374 | 340 | — |
| 7/93 | 330 | 415 | 435 | 385 | 380 |
| 9/91 | 330 | 375 | 425 | 445 | 425 |
| 13/87 | 330 | 398 | 460 | 505 | 465 |
| 17/83 | 330 | 395 | 475 | 500 | — |

TABLE 2

DRAINAGE COMPARISONS

| Starch Used | Sole Used | Freeness, ml at Starch Loading of | | | | |
|---|---|---|---|---|---|---|
| | | 0 lb./t | 5 lb./t | 10 lb./t | 20 lb./t | 30 lb./t | 40 lb./t |
| BMB S-190 (Compozil) | BMA-9 | 310 | 0 | 340 | 365 | 345 | 345 |
| BMB S-190 | 13/87 | 310 | 305 | 370 | 460 | 465 | 430 |
| Stalok 400 | 13/87 | 310 | — | 340 | 425 | 445 | 420 |
| Stalok 324 | 13/87 | 310 | — | 295 | 310 | 335 | — |

All test at 3 lb./t sol.

TABLE 3

DRAINAGE COMPARISONS AT pH 8

| Sol used | Freeness, ml at Sol Loading of | | | | |
|---|---|---|---|---|---|
| | 0 lb./t | 2 lb./t | 4 lb./t | 6 lb./t | 8 lb./t |
| BMA-9 | 285 | 330 | 380 | 415 | 440 |
| 13/87 Polyaluminosilicate | 285 | 470 | 445 | 425 | — |
| $SiO_2$ Polysilicic Acid | 285 | 295 | 285 | — | 285 |
| $Al_2O_3$ Sodium Aluminate | 285 | 275 | 280 | — | 280 |

All tests at 20 lb./t cationic starch.
Sodium aluminate added on $Al_2O_3$ basis.

TABLE 4

FINES RETENTION AT pH 8

| Sol Type | % Fines Retention at Cationic Starch Loading of | | | | | |
|---|---|---|---|---|---|---|
| | 0 lb./t | 4 lb./t | 8 lb./t | 12 lb./t | 16 lb./t | 20 lb./t |
| BMA-9 | 27 | 36 | 42 | 46 | 49 | 46 |
| Polyaluminosilicate 13/87 | 27 | 42 | 60 | 73 | 74 | 82 |

TABLE 5

DRAINAGE TESTS.
100% STONEGROUND WOOD AT pH 4

| lb./t Polyaluminosilicate Loading | Freeness ml | Turbidity N.T.A. Units |
|---|---|---|
| 0 | 235 | 38 |
| 1 | 250 | 27 |
| 2 | 300 | 21 |
| 3 | 335 | 21 |
| 4 | 355 | 16 |
| 6 | 380 | 13 |
| 8 | 395 | 14 |
| 9 | 390 | 16 |

All test at 20 lb./t cationic starch.

TABLE 6

DRAINAGE COMPARISONS

| Sol Used | Furnish pH | Freeness, ml at Sol Addition of (lb./ton) | | | | | |
|---|---|---|---|---|---|---|---|
| | | 0 | 1 | 2 | 4 | 6 | 8 |
| Furnish only | 4.5 | 440 | — | — | — | — | — |
| BMA-9 | 4.5 | 530 | 480 | 490 | 510 | 530 | 580 |
| Polyaluminosilicate | 4.5 | 530 | 500 | 530 | 570 | 625 | 650 |
| Furnish only | 8.0 | 380 | — | — | — | — | — |
| BMA-9 | 8.0 | 390 | 370 | 380 | 420 | 450 | 525 |
| Polyaluminosilicate | 8.0 | 390 | 430 | 470 | 570 | 660 | 695 |

TABLE 7

DRAINAGE COMPARISONS

| Sol Used | Freeness, ml at Sol Loading of | | | |
|---|---|---|---|---|
| | 0 lb./t | 2 lb./t | 4 lb./t | 8 lb./t |
| Furnish only | 390 | — | — | — |
| BMA-9 | 580 | 660 | 680 | 670 |
| Polyaluminosilicate | 580 | 690 | 700 | 705 |

TABLE 8

DRAINAGE TESTS
EFFECT OF POLYSILICIC AGE ON
POLYALUMINOSILICATE PERFORMANCE

| Polysilicic Acid Age. Mins. | CSF Freeness ml |
|---|---|
| 7 | 590 |
| 36 | 650 |
| 96 | 620 |
| 156 | 610 |
| BMA-9 Comparison | 460 |

I claim:

1. A method for the production of water soluble polyaluminosilicate microgels which consist essentially of aggregates of very small particles of silica, surface aluminated and having a surface area of at least about 1000 meters$^2$/gram, said aggregates being formed into chains and crosslinked into three-dimensional networks, comprising the steps of
   (a) acidifying a dilute solution of alkali metal silicate containing about 0.1 to 6 wt. % SiO$_2$ to a pH of between 2 and 10.5 to produce polysilicic acid, followed by
   (b) reacting a water soluble aluminate with the polysilicic acid before the polysilicic acid has gelled such that a product with an alumina/silica mole ratio greater than about 1/100 is obtained; and then
   (c) diluting the reaction mix before gelation has occurred to the equivalence of about 2.0 wt. % SiO$_2$ or less to stabilize the microgels.

2. The method of claim 1 wherein the alkali metal silicate solution contains about 1 to 2 wt. % SiO$_2$ and the acidification in step (a) is conducted stagewise over a period of about one hour or more.

3. The method of claim 2 wherein the pH is between 2.5 and 5.

4. The method of claim 1 wherein the alumina/silica mole ratio is between (1/15) 1/25 and ¼.

5. The method of claim 3 wherein the alumina/silica mole ratio is between (1/15) 1/25 and ¼.

6. The method of claim 1 wherein the alkali metal silicate is sodium silicate or polysilicate and the water soluble aluminate is sodium aluminate.

7. The method of claim 6 wherein the alkali metal silicate solution contains about 1 to 2 wt. % SiO$_2$ and the acidification in step (a) is conducted stagewise over a period of about one hour or more.

8. The method of claim 7 wherein the pH is between 2.5 and 5.

9. The method of claim 8 wherein the alumina/silica mole ratio is between (1/15) 1/25 and ¼.

10. The method of claim 9 wherein the alumina/silica mole ratio is between about 1/6 and 1/7.

11. The method of claim 1 wherein the alkali metal silicate solution contains about 3 to 6 wt. % SiO$_2$.

12. The method of claim 6 wherein the alkali metal silicate solution contains about 3 to 6 wt. % SiO$_2$.

13. An aqueous mixture comprising a water soluble polyaluminosilicate microgel which microgel consists essentially of aggregates of very small particles of silica, surface aluminated and having a surface area of at least about 1000 meters$^2$/gram, said aggregates being formed into chains and cross-linked into three-dimensional networks, and being present in the equivalence of about 2.0 wt % SiO$_2$ or less and having an alumina to silica mole ratio of greater than 1 to 100.

14. The aqueous mixture of claim 13 wherein the microgel has a surface activity of about 0.6 milliequivalents per gram or greater.

* * * * *

UNITED STATES PATENT AND TRADEMARK OFFICE
CERTIFICATE OF CORRECTION

PATENT NO. : 5,176,891

DATED : January 5, 1993

INVENTOR(S) : John D. RUSHMERE

It is certified that error appears in the above-identified patent and that said Letters Patent is hereby corrected as shown below:

Column 14, line 4, please delete "(1/15)".

Column 14, line 6, please delete "(1/15)".

Column 14, line 17, please delete "(1/15)".

Signed and Sealed this

Fourteenth Day of December, 1993

*Attest:*

BRUCE LEHMAN

*Attesting Officer*     *Commissioner of Patents and Trademarks*